Figure 1:
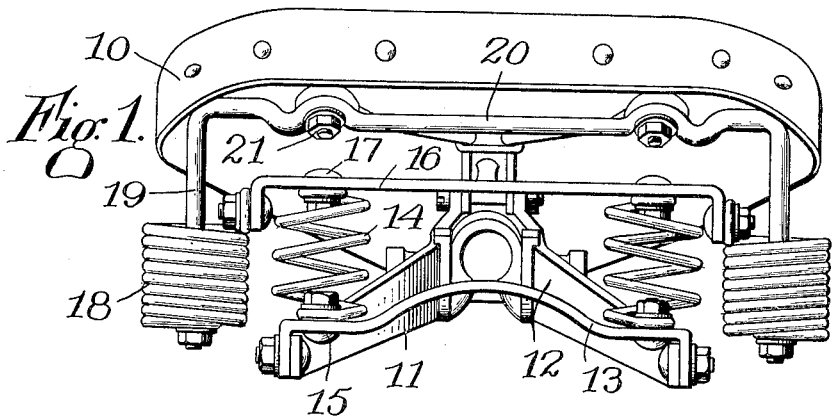

C. A. PERSONS.
SPRING SADDLE.
APPLICATION FILED MAR. 17, 1913.

1,084,226.

Patented Jan. 13, 1914.

Witnesses
R. D. Tolman
H. M. Kennedy

Inventor
Charles A. Persons.
By Hardy W. Bartlett
Attorney

UNITED STATES PATENT OFFICE.

CHARLES A. PERSONS, OF WORCESTER, MASSACHUSETTS.

SPRING-SADDLE.

1,084,226.  Specification of Letters Patent.  Patented Jan. 13, 1914.

Application filed March 17, 1913. Serial No. 755,007.

*To all whom it may concern:*

Be it known that I, CHARLES A. PERSONS, a citizen of the United States, residing at Worcester, in the county of Worcester, State of Massachusetts, have invented a certain new and useful Improvement in Spring-Saddles, of which the following is a specification, reference being had therein to the accompanying drawings.

This invention relates to seats for vehicles, but more particularly to seats or saddles for bicycles, motorcycles, velocipedes and the like, and has for its object to provide a structure having great vibration absorption, resiliency and smoothness of action.

It is particularly important that compactness without loss of efficiency be provided on account of the introduction of the spring frame in motorcycles where the seat has a range of vertical movement greater than that found in its own spring support, owing to the rise and fall of a portion of the motorcycle frame. In some cases, it is impossible to use a saddle in which the extension springs hang below the seat supporting frame as these springs in their extended position come in contact with the frame of the motorcycle to the serious discomfort of the rider. Also motorcycle riders desire a low seat so that they can place their feet upon the ground without dismounting.

In my earlier form of saddle of the same type which was shown in Letters Patent of the United States, Number 959,591, dated May 31, 1910, the extension springs were suspended by their upper extremities from the rear extension of the supporting frames or trusses, upright rods had their lower extremities secured to the lower extremities of these springs, a bracing member connected with upper extremities of these rods, and compression springs were interposed between this brace and the under side of the cantle portion of the seat. In such a structure, the seat was necessarily a considerable distance above the lower extremities of the extension springs and therefore the seat must be high above the frame in order to avoid striking the frame in the manner described. To overcome these disadvantages, a form of saddle has been devised in which the same compound spring action is obtained as in my earlier type but the springs are much more compactly arranged and all springs are normally above the supporting frame.

The many other features and advantages of this invention will be fully described hereinafter and included in the claims.

One embodiment of the invention is shown in the drawings in which:—

Figure 2:
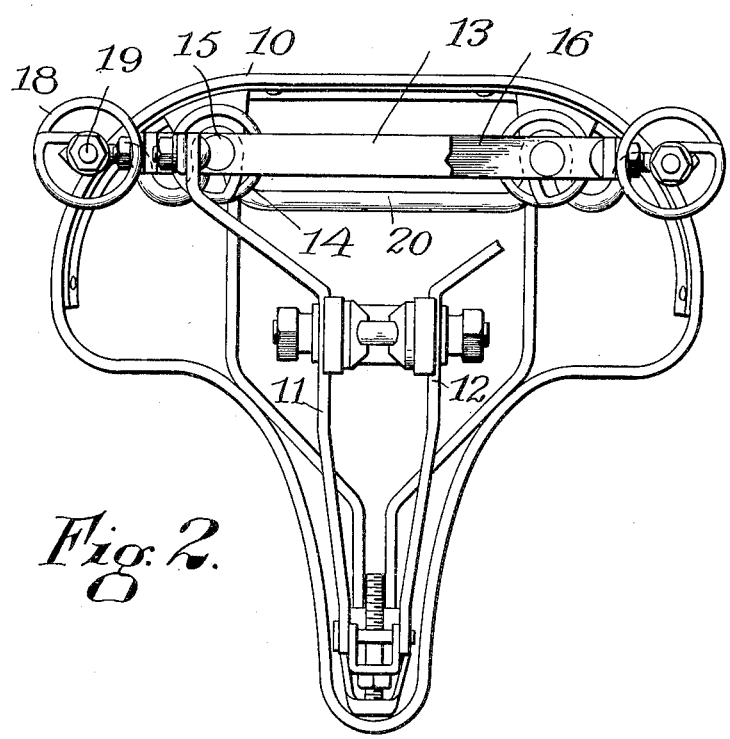

Figure 1 is a rear elevation of the invention complete, and Fig. 2, same as Fig. 1, bottom view.

Referring to the drawings, the preferred embodiment of the invention comprises a seat 10 mounted upon a supporting frame consisting of two trusses or frames 11 and 12, but as each of these trusses and this means of connection with the seat is the same except that the parts are reversed, only one will be described hereinafter as this description will apply equally to the other. The supporting frames or trusses may be secured to the peak of the seat by any suitable means.

Connecting the rear extremities of the trusses 11 and 12 is a brace member 13 to the upper face of which is secured the lower extremity of the compression spring 14 by means of the bolt 15. To the upper extremity of this spring 14 is secured a bridge 16 by means of the bolt 17. From the outer extremity of this bridge 16 is suspended the extension spring 18 and to the lower extremity of this spring 18 is secured the lower extremity of the upright rod 19 which here forms part of the frame 20 secured to the under side of the cantle portion of the seat 10 by means of the bolts 21.

The applicant is aware that a large number of changes in the construction and arrangement of parts may readily be made by any one skilled in the art without departing from the scope of his invention and he does not care to be limited to the particular embodiment herein shown and described.

What I claim as my invention and desire to secure by Letters Patent is:—

1. In a device of the class described, a seat, a supporting frame therefor, and resilient supports connecting said seat with said frame comprising coil compression springs having their lower extremities connected to said frame and projecting upwardly therefrom, coil extension springs having their upper extremities connected to the upper extremities of said compression springs and separated therefrom, and substantially upright rods connecting the lower extremities of said extension springs with the seat.

2. In a device of the class described, a seat, a supporting frame therefor, and resilient supports connecting said seat with said frame comprising, coil compression springs having their lower extremities secured to the rear extremities of said frame and extending upwardly therefrom, bracing means connecting the upper extremities of said compression springs, extension coil springs having their upper extremities connected to corresponding upper extremities of said compression springs and separated therefrom, and a substantially upright rod connecting the underside of said seat with the lower extremity of each of said extension springs.

3. In a device of the class described, a seat, a supporting frame therefor, and resilient supports interposed between said seat and said frame comprising, coil compression springs having their lower extremities secured to the upper face of said frame and extending upwardly therefrom, a rigid brace member connecting the upper extremities of said compression springs, coil extension springs suspended by their upper extremities from said rigid member and separated from said compression springs, and a substantially upright rod connecting the lower extremity of each of said extension springs with the under side of said seat.

4. In a device of the class described, a seat, a supporting frame therefor composed of a pair of oppositely disposed trusses, means for connecting the forward portion of said trusses with the peak of the seat, a brace member connecting the rear extremities of said trusses, a pair of compression springs having their lower extremities secured to said brace member and extending upwardly therefrom, a bridge connecting the upper extremities of said compression springs and having its extremities extending laterally beyond such points of connection, extension springs suspended by their upper extremities from the extremities of said bridge, and a rigid post connecting the lower extremity of each of said extension springs with the under side of the cantle portion of the seat.

5. In a device of the class described, a seat, a supporting frame therefor, and resilient supporting means connecting said frame with said seat comprising, compression springs having substantially their lower extremities resting on said supporting frame, means for connecting substantially the upper extremities of said compression springs, extension springs suspended from said connecting means, and means for connecting the lower extremities of said extension springs with said seat.

6. In a device of the class described, a seat, a supporting frame therefor, and resilient supporting means connecting said frame with said seat comprising, compression springs having substantially their lower extremities resting on said supporting frame, a bridge connecting the upper extremities of said compression springs, extension springs suspended from said bridge, and rods connecting the lower extremities of each of said extension springs with said seat.

In testimony whereof I affix my signature in the presence of two witnesses.

CHARLES A. PERSONS.

Witnesses:
HARTLEY M. BARTLETT,
HANNAH M. KENNEDY.

Copies of this patent may be obtained for five cents each, by addressing the "Commissioner of Patents, Washington, D. C."